United States Patent [19]
Juri et al.

[11] Patent Number: 5,999,693
[45] Date of Patent: *Dec. 7, 1999

[54] FLAGGED VIDEO SIGNAL PROCESSING APPARATUS AND METHOD

[75] Inventors: Tatsuro Juri, Osaka; Makoto Gotou; Susumu Yamaguchi, both of Nishinomiya, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/904,460

[22] Filed: Aug. 1, 1997

Related U.S. Application Data

[63] Continuation of application No. 08/269,022, Jun. 30, 1994, abandoned.

[30] Foreign Application Priority Data

Jul. 1, 1993 [JP] Japan .................................... 5-163418
Jul. 8, 1993 [JP] Japan .................................... 5-168901

[51] Int. Cl.⁶ .................................................... H04N 5/76
[52] U.S. Cl. ................................ 386/68; 386/95; 348/474
[58] Field of Search .................................... 386/1, 4, 6, 95, 386/125, 8, 96, 98, 68, 81, 113, 116, 44; 348/1, 97, 446, 461, 465, 464, 469, 473, 474, 479, 486; 360/18, 20; H04N 5/92, 5/76, 5/253, 9/11, 9/47, 3/36, 7/01, 7/02, 7/00, 11/00, 7/08, 7/084, 7/087

[56] References Cited

U.S. PATENT DOCUMENTS

| | | | |
|---|---|---|---|
| 4,701,783 | 10/1987 | Glenn | 348/389 |
| 5,122,913 | 6/1992 | Yamamoto | 360/53 |
| 5,343,248 | 8/1994 | Fujinami . | |
| 5,353,059 | 10/1994 | Lawlor et al. | 386/116 |
| 5,457,499 | 10/1995 | Lim | 348/558 |
| 5,461,420 | 10/1995 | Yonemitsu et al. | 348/401 |
| 5,510,902 | 4/1996 | Fujinami et al. | 348/97 |
| 5,666,461 | 9/1997 | Igarashi et al. | 386/95 |
| 5,777,691 | 7/1998 | Kubo et al. | 386/8 |

FOREIGN PATENT DOCUMENTS

| | | | |
|---|---|---|---|
| 0381222 | 8/1990 | European Pat. Off. . | |
| 0522522 | 1/1993 | European Pat. Off. . | |
| 0595323 | 5/1994 | European Pat. Off. . | |
| 2249899 | 5/1992 | United Kingdom | H04N 7/01 |
| WO92/09172 | 5/1992 | WIPO | H04N 7/08 |

OTHER PUBLICATIONS

Patent Abstracts Of Japan, vol. 17, No. 331 (E–1386) Jun. 23, 1993.
NHK Laboratories Note, No. 348, Jul. 1987, Tokyo, Japan, pp. 1–34, Ninomiya et al., "Concept Of The Muse System And Its Protocol", p. 27, par. 6.1 * p. 29, Table Al, bit No. 24.
"An Experimental Study On A Home–Use Digital VTR", C. Yamamitsu et al., 1989 IEEE, pp. 122–123.

*Primary Examiner*—Thai Tran
*Attorney, Agent, or Firm*—Wenderoth, Lind & Ponack, L.L.P.

[57] ABSTRACT

A video data is accompanied or multiplexed with one or more flags indicating a relation between fields or frames of video data for transmission or recording. An interlace flag determines whether the video data is interlaced or not. A still image flag determines whether the video data carries a motion image, a field still image, or a frame still image. A frame change flag determines whether or not a given frame of the still image is identical to its previous frame. At least one of the three different flags is multiplexed with its relevant video data.

6 Claims, 7 Drawing Sheets

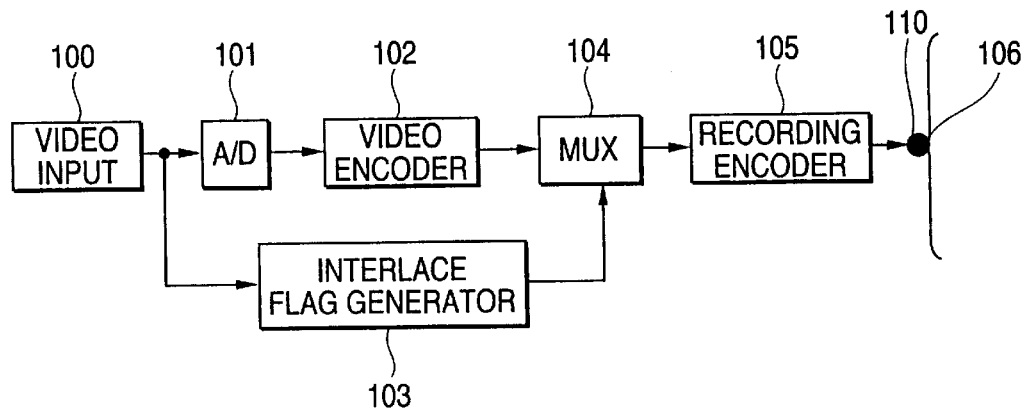
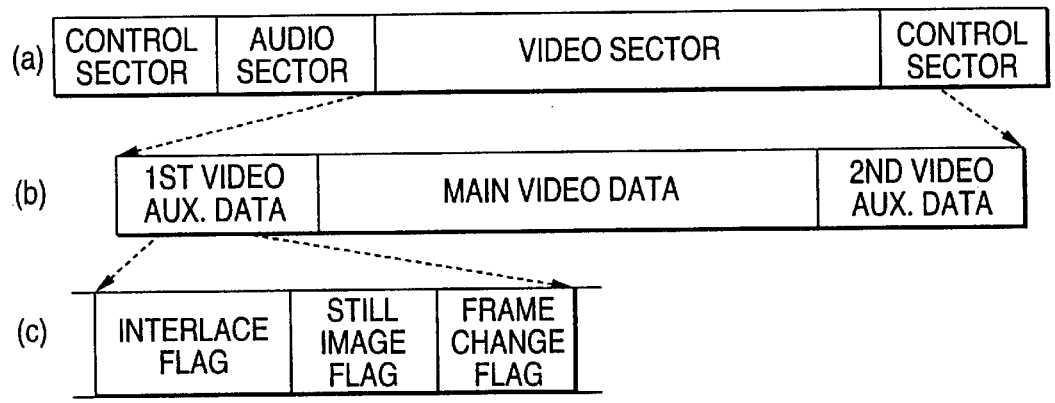
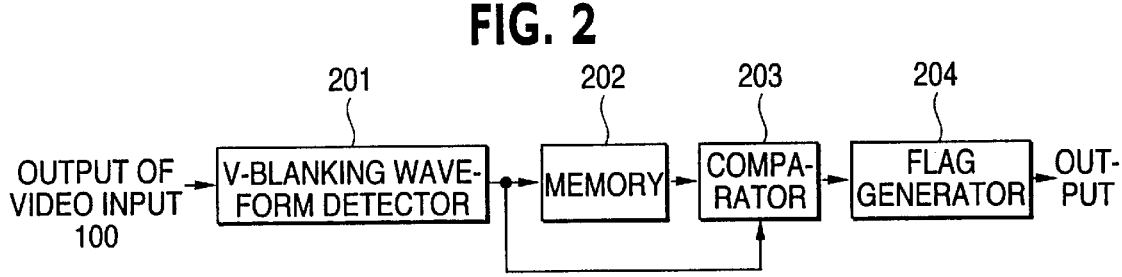

# FLAGGED VIDEO SIGNAL PROCESSING APPARATUS AND METHOD

This application is a continuation of now abandoned application Ser. No. 08/269,022, filed Jun. 30, 1994.

BACKGROUND OF THE INVENTION

1. Field of the Invention

The present invention relates to a recording apparatus for transmitting or recording a video signal and to a reproducing apparatus for reproducing the video signal.

2. Description of the Prior Art

It is known that the conventional television signals are transmitted or recorded on a frame by frame basis. Each frame comprises two fields in which a horizontal scanning line of one field falls between two adjacent horizontal lines of the other field in the frame. This is called as interlaced scanning.

Accordingly, the video signal is transmitted or recorded as interlaced signals in a video signal transmitting or recording apparatus. For reproduction of the video signal, the two fields are interlaced to one frame. The frame by frame basis recording, transmission, or reproduction is applicable to not only a motion image but also a still or slow-motion image.

However, there are some drawbacks with such conventional video signal recording or reproducing apparatus:

(1) In common home video game machines, two corresponding horizontal lines of their respective fields of a frame are allocated to the same location on a screen for preventing flicker caused by interlacing of the two fields. They are thus called non-interlaced fields. If such a non-interlaced video signal transmitted or recorded is interlaced in reproduction, it will produce flicker. P (2) For a still image shot by a camera, each field of its data is temporarily stored in a memory and then transmitted or recorded for a plurality of field periods. Such still image data will also produce flicker when interlaced and reproduced, similar to the non-interlaced signal of the paragraph (1).

(3) While a recorded TV signal is reproduced in a slow-motion or still mode, a single field of its data is continuously pulled for a plurality of field periods. Such slow-motion or still image data after transmitted or recorded will produce flicker when interlaced and reproduced, as well as the still image data of the paragraph (2).

(4) If still images and motion images are recorded in a combination, they will hardly be discriminated from each other during the reproduction. Also, it will be difficult to determine whether a still or slow-motion image is reproduced on a frame by frame basis or a field by field basis.

(5) When an error occurs during the reproduction of a still image, it is generally eliminated by error concealment. However, since two consecutive frames are not always correlated, a technique of inter-frame concealment can unsuccessfully be used. If the inter-frame concealment is enforced, the quality of a reproduced image may critically be impaired.

(6) When a still image is recorded in multiple frames, it will be hard to identify the starting frame of a succeeding still image and the searching of still images by frames will almost be infeasible.

(7) Any image data which has been reproduced in a slow-motion or still mode and transmitted or recorded will hardly be identified whether it is a common motion image or a slow-motion or still image.

SUMMARY OF THE INVENTION

It is an object of the present invention to provide video signal recording and reproducing apparatuses in which the above drawbacks are eliminated and a video signal can be recorded, transmitted, or reproduced at optimum level depending on its mode.

A video signal recording apparatus according to a first aspect of the present invention comprises: an interlace flag generating means for assigning a non-interlace value to an interlace flag when two horizontal scanning lines of their respective fields of each frame of an input video signal are not interlaced and an interlace value when the same are interlaced; a multiplexing means for multiplexing the interlace flag with its relevant video data to produce a multiplexed video signal; and a means for transferring or recording the multiplexed video signal.

In the operation of the foregoing apparatus, it is examined whether the input video signal is interlaced or not and a resultant information flag is transmitted or recorded together with the video data. For example, if a video signal of a home video game machine is received for reproduction, it can selectively be processed by interlacing or non-interlacing process.

If a video signal of still images which is introduced from a camera has temporarily been stored on a field by field basis in a memory and transmitted or recorded in the form of a series of identical fields, it is identified as a non-interlaced signal. Hence, field data for the still image transmitted and recorded can be reproduced as a non-interlaced image, which does not generate flicker.

Also, when a recorded video data is reproduced field by field in a slow-motion or still image mode and then transmitted or recorded again, it is identified as a non-interlaced signal. The field data in the slow-motion or still image mode will thus be reproduced as a non-interlaced image free from flicker.

A video signal recording apparatus according to a second aspect of the present invention comprises: a still image flag generating means for assigning a still image value to a still image flag when a video data of a frame of an input video signal is a still image being still over two fields and a motion-image value when it is judged that the same is a motion image moving between two fields; a multiplexing means for multiplexing the still image flag with the video data of the frame to produce a multiplexed video signal; and a means for transmitting or recording the multiplexed video signal.

In the operation, the still image flag is transmitted or recorded together with the video data and used to examine whether the video data carries a still image or a motion image during reproduction on a frame by frame basis. When it is judged that the video data is a still image, the reproducing mode is automatically shifted to a slow-motion or still image mode. When the slow-motion or still image mode is first selected, still image video data is reproduced on a frame by frame basis and motion image video data is reproduced on a field by field basis. If the video data is an interlaced still image, it can be processed frame by frame in the still image mode to reproduce a still image of high quality. If the video data carries a motion image, it can be processed field by field to reproduce a still image having no flicker nor dancing.

For recording a desired still image, at least three identical frames are processed in succession and can thus be prevented from deterioration of the quality during the error concealment. It is known that during recording of video data with a VCR, a record is interrupted between any two still images resulting in higher error rate. According to the present invention, a succession of identical frames permits ease of error concealment between the frames.

A video signal processing apparatus for transmitting or recording a still image according to a third aspect of the present invention comprises: a frame change flag generating means for repeating a frame of a still image for n frame periods (n being an integer more than two) and assigning a different still image value to a frame change flag applied to a first one of the n frames and an identical still image value to the frame change flag applied to each of a second to n-th frames, the frame change flag being indicative of whether the still image frame is identical to or different from a previous frame; a multiplexing means for multiplexing the frame change flag with the video data of the frame to produce a multiplexed video signal; and a means for transmitting or recording the multiplexed video signal.

In the operation, the frame change flag is transmitted or recorded together with the video data and in reproduction, the change from a frame to another is identified by detecting the frame change flag. Thus, the frame-by-frame reviewing will be possible in the still image reproducing mode. Since the frame change flag is indicative of a range of identical frames, the error concealment can be executed between the identical frames of a single still image, thus preventing any quality deterioration.

Also, during the slow-motion/still image reproducing mode, the frame change flag is applicable to reproduced frames which are then transferred or recorded. Accordingly, the slow-motion/still image mode frames with the frame change flag can easily be discriminated from normal reproducing mode frames.

BRIEF DESCRIPTION OF THE DRAWINGS

FIG. 1a is a block diagram showing a first embodiment of the video signal recording apparatus of the present invention;

FIG. 1b is an explanatory view showing a multiplexed format of the first embodiment;

FIG. 2 is a block diagram of an exemplary arrangement of an interlace flag generator according to the present invention;

DESCRIPTION OF THE PREFERRED EMBODIMENTS

Figure 3:
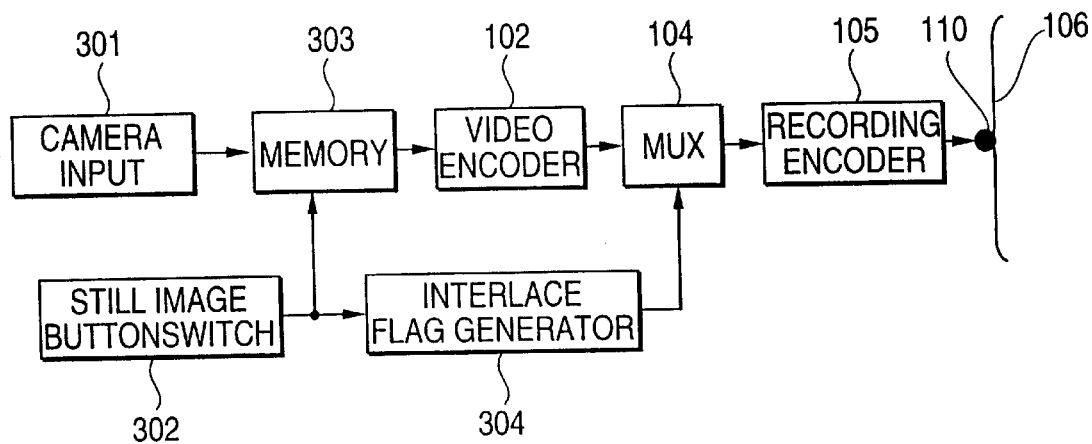
FIG. 3 is a block diagram showing a second embodiment of the video signal recording apparatus of the present invention.

FIG. 1a is a block diagram of a first embodiment of the video signal recording apparatus according to the present invention. A video signal fed through a video input 100 is converted by an analog-to-digital or AD converter 101 to its digital equivalent. The digital video signal is transmitted to a video encoder 102 and an interlace flag generator 103. The video encoder 102 encodes the digital video signal to a specific format suitable for recording, where the encoding may be carried out using a known video data compression method. The video data compression method allows the digital video signal to be divided into blocks, each block comprising a group of adjacent pixels, and then subjected to orthogonal transformation to produce its data compressed form. At the result of the encoding, the data of the digital video signal is compressed and reduced considerably.

The interlace flag generator 103 examines whether two fields of a frame in the video signal are interlaced or not and produces an interlace flag according to the result of examination.

The interlace flag is then multiplexed with the encoded image data from the video encoder 102 by a multiplexer 104. A resultant composite data is transferred to a recording encoder 105 where it is error correction encoded and frequency encoded before being recorded by a magnetic head 110 onto a magnetic recording tape 106.

The multiplexer 104 will now be explained in more details referring to FIG. 1b. FIG. 1b illustrates the allocation of a record with the use of a digital video cassette recorder (DVCR). As shown, denoted by (a) is one of a series of helical recording tracks defined on the magnetic tape by the DVCR which comprises an audio sector for storage of digital audio data, a video sector for storage of digital video data, and control sectors assigned to the front and rear ends of the track for storage of control factors including an index information. The video sector comprises first and second video auxiliary data and a main video data, as shown in (b) of FIG. 1b. The first video auxiliary data includes video sector control data and time codes required for reproduction of the main video data. In particular, the first video auxiliary data contains a flag field as shown in (c) of FIG. 1b. In this flag field, the interlace flag of one bit is followed by a still image flag of one bit and a frame change flag of one bit which both will be described later. Although this embodiment employs three different types of the flags, one or two of them may be used as desired. For increasing the reliability, multiple sets of the three flags may repeatedly be recorded at equal intervals. It should be understood that the format of the recording track is not limited to that shown in FIG. 1b.

As the interlace flag is inserted, the video signal can readily be identified whether it is an interlaced or non-interlaced signal. If the video signal is a non-interlaced signal such as an output of a video game machine, it is not interlaced in reproduction thus preventing the generation of flicker.

FIG. 2 shows an exemplary arrangement of the interlace flag generator 103, in which a video signal output of the video input 100 is fed to a V blanking waveform detector 201 where the waveform of a vertical blanking period is extracted. The waveform is then stored in a memory 202. A vertical blanking waveform of the succeeding field delivered directly from the V blanking waveform detector 201 is compared by a comparator 203 with the waveform of the previous field stored in the memory 202. If the two waveforms are not identical to each other, it is judged that the video signal is an interlaced signal. Accordingly, a flag generator 204 assigns 1 of a binary bit to the interlace flag when the comparator 203 detects the interlaced signal and 0 when it detects a non-interlaced signal.

When the two vertical blanking waveforms of their respective fields are identical, it is determined by the above flag setting arrangement of FIG. 2 that the video signal is a non-interlaced signal such as an output of a video game machine. The flag setting according to the present invention is not limited to the arrangement shown in FIG. 2 and may be executed by any appropriate manner.

FIG. 3 is a block diagram of a second embodiment of the video signal recording apparatus according to the present invention, where a video signal is fed through a camera input 301 and stored in a memory 303. The memory 303 in response to a still image message from a still image button switch 302 mounted to a video camera delivers the video signal to a video encoder 102. The still image button switch 302 allows an operator to determine whether a still picture to be taken is of field or frame format. The still image message is thus indicative of a mode of the video signal fed through the camera input 301: a motion image, a field format still image, or a frame format still image. The field format images are two times greater in number than the frame format images. On the contrary, the frame format images are higher in the quality than the field format images.

When the video signal is a field format still image, the memory 303 delivers data of a desired field to the video encoder 102 for a plurality of field periods. When the video signal is a frame format still image, the memory 303 sends data of one frame to the video encoder 102 for a plurality of frame periods. When the video signal is a motion image, it delivers data of one field for a field period. The video signal is compressed and encoded by the video encoder 102 to its recording form.

The still image message from the still image switch 302 is also transferred to an interlace flag generator 304. When the field format still image is detected, the interlace flag is set to 0 for non-interlacing. When the frame format still image or motion image is introduced, the interlace flag is set to 1.

The interlace flag is multiplexed by a multiplexer 104 with the encoded video signal from the video encoder 102. A resultant composite signal is subjected to error concealment and frequency encoding processes in a recording encoder 105 for converting to a recording format signal suitable for magnetic recording through a record head 110 onto a magnetic tape 106.

In common, if the field format still image is interlaced in reproduction, it will oscillate vertically between fields producing a so-called dancing effect. According to the foregoing arrangement shown in FIG. 3, when the input video signal carries a succession of identical field image data, it is not interlaced to avoid the dancing effect during the reproduction. The camera input 301 is not limited to the receipt of a video camera signal but may be connected to any still image producing apparatus.

Figure 4:
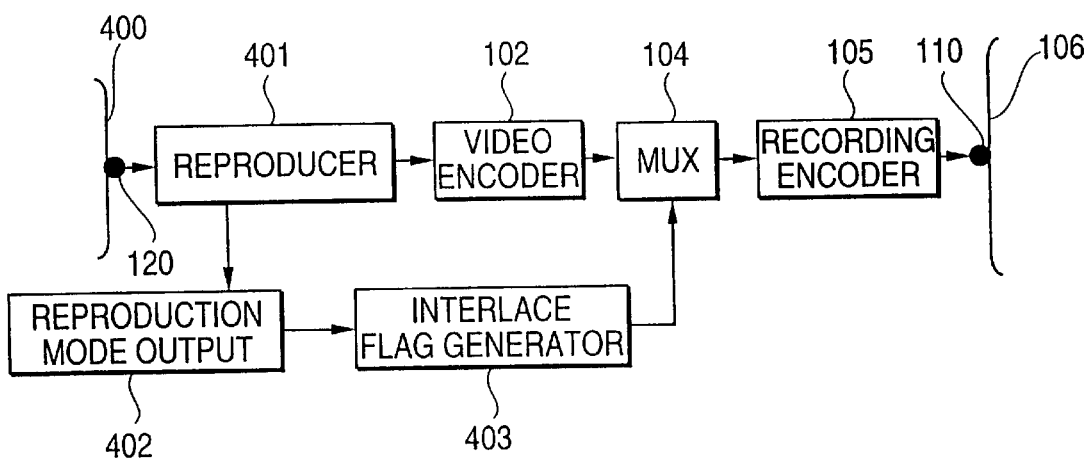
FIG. 4 is a block diagram showing a third embodiment of the video signal recording apparatus of the present invention.

FIG. 4 illustrates a third embodiment of the video signal recording apparatus according to the present invention, in which a recorded video data is reproduced and recorded again. In a reproducing unit of the apparatus, the video data stored on a magnetic tape 400 is retrieved with a playback head 120 and reconstructed with a reproducer 401. Simultaneously, the reproducer 401 delivers to a reproducing mode output 402 a playback information of common motion, slow-motion, or still image mode reproduction. The reproducing mode output 402 determines the reproducing mode from the tape feed movement and the result of a process in the reproducer 401.

The video data reconstructed by the reproducing unit is then transferred to a video encoder 102 where it is compressed and encoded to its recording form.

Similarly, a reproducing mode signal from the reproducing mode output 402 is transmitted to an interlace flag generator 403 where when the video data is a slow-motion or still field image, an interlace flag is set to "0" for non-interlacing and when not, an interlace flag is set to "1" for interlacing.

The interlace flag is multiplexed by a multiplexer 104 with the video data from the video encoder 102.

A resultant composite data is subjected to error correction and frequency encoding processes in a recording encoder 105 for converting to a recording format signal suitable for magnetic recording through a record head 110 onto a magnetic tape 106.

Equally in this arrangement, when the video data is a succession of identical fields in a slow-motion or still image mode, it is not interlaced in reproduction to prevent the dancing effect. It is also possible that if the video data is an encoded form, it is bypassed without passing across the video encoder 102.

Figure 5:
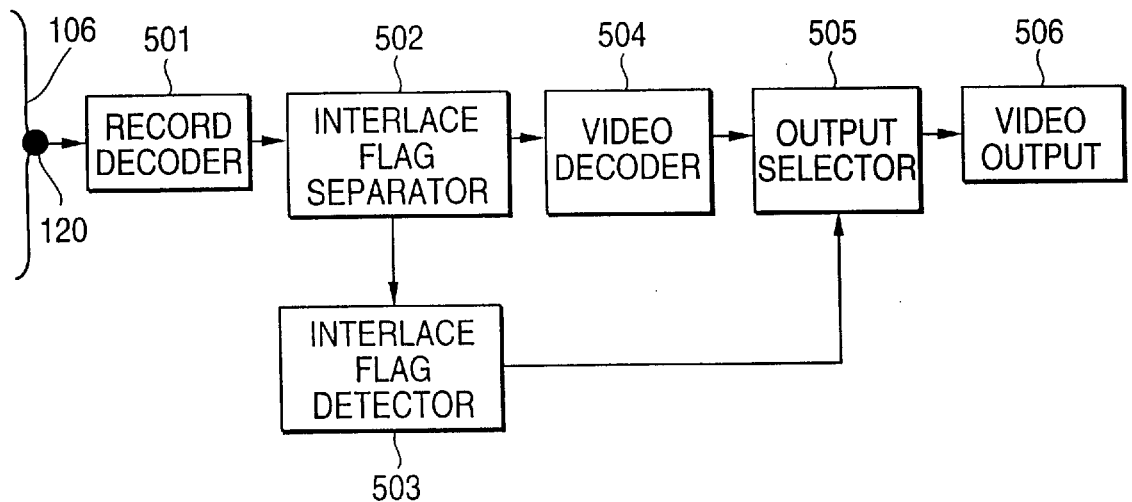
FIG. 5 is a block diagram showing a first embodiment of the video signal reproducing apparatus of the present invention.

FIG. 5 shows a first embodiment of the video signal reproducing apparatus according to the present invention, in which the video data recorded by one of the video signal recording apparatuses shown in FIGS. 1, 3, and 4 is reproduced. The video signal retrieved by a playback head 120 from a magnetic tape 106 is demodulated, reshaped, and error corrected by a decoder 501. A resultant decoded digital data is separated by an interlace flag separator 502 into a video data and an interlace flag. The video data is decoded on a field by field basis by a video decoder 504 and fed to an output mode selector 505.

The interlace flag is transferred to an interlace flag detector 503 where it is examined to determine whether or not the video data is an interlaced signal. If the video signal is an interlaced signal, the video data is subjected to interlacing by the output mode selector 505 and transmitted to a video output 506. If not, the video data is not interlaced across the output mode selector 505 and delivered to the video output 506.

Accordingly, the video data will be reproduced in the same mode as of the recording thus causing no dancing effect and no flicker. It would be understood that the non-interlaced video signal is applicable to any other enhancement process for optimum output.

Figure 6:
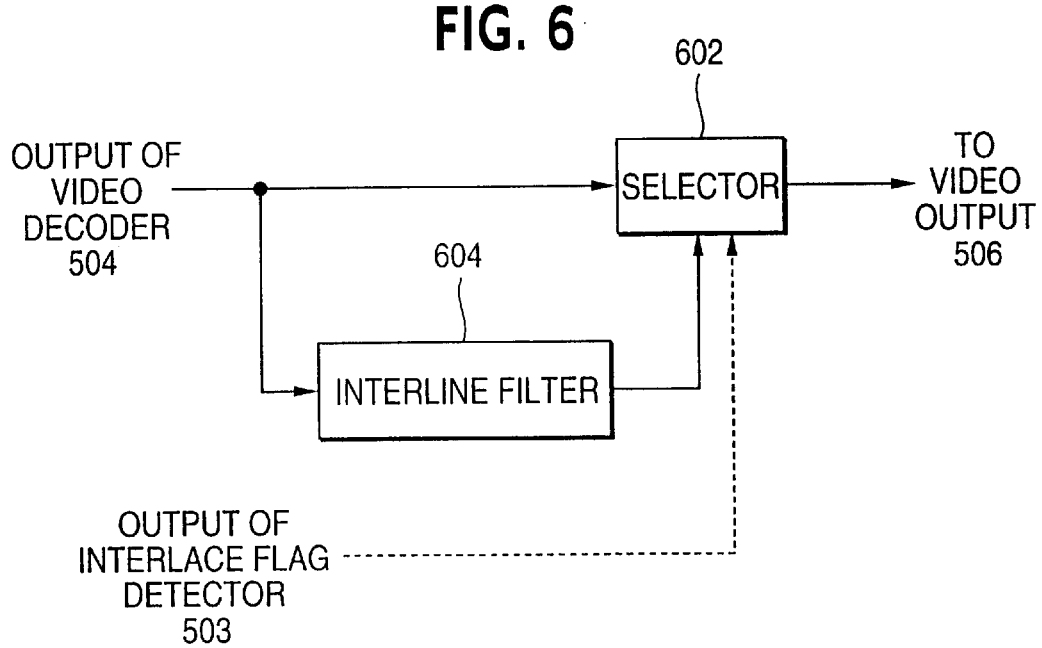
FIG. 6 is a block diagram of an exemplary arrangement of an output mode selector according to the present invention.

FIG. 6 is a block diagram showing an exemplary arrangement of the output mode selector 505 shown in FIG. 5. As shown, the video signal decoded by the video decoder 504 is fed to a selector 602 and an interline filter 604. The interline filter 604 performs interline filtering so that two scanning lines of their respective fields of the video signal are interlaced. If the video signal is interlaced, the selector 602 transmits directly the video data from the video decoder 504 to the video output 506 in response to a mode information output of the interlace flag detector 503. If the video signal carries a non-interlaced data, it is passed through the interline filter 604 for interlacing action before delivering to the video output 506.

According to the arrangement shown in FIG. 6, since the non-interlaced signal is subjected to the interlacing action of the interline filter 604, it will be delivered as an interlaced signal with no dancing effect.

Figure 7:
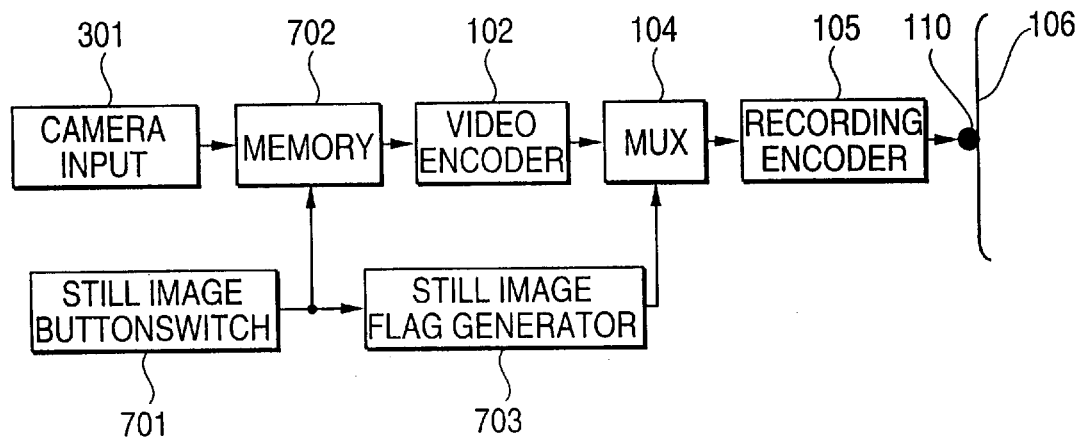
FIG. 7 is a block diagram showing a fourth embodiment of the video signal recording apparatus of the present invention.

FIG. 7 illustrates a fourth embodiment of the video signal recording apparatus according to the present invention, where a video signal fed to a camera input 302 is transmitted to a memory 702. When a still image is desired, a still image button-switch 701 mounted to a camera is pressed. Then, a mode signal of 0 is fed from the still image button-switch 701 to the memory 702 and a still image flag generator 703. When a motion image is requested, a mode signal of 1 is released from the still image button-switch 701. In synchronization with the mode signal from the still image button-switch 701, the memory 702 delivers the video data of a motion image on a frame by frame basis to a video encoder 102. If the memory 702 receives the signal of a still image, it delivers a succession of identical frames.

The video data is then compressed and encoded by the video encoder 102 to its recording form which is transferred to a multiplexer 104. The still image flag generator 703 produces a still image flag of 0 when the video data is a still image and of 1 when it is a motion image. The still image flag is also fed to the multiplexer 104.

The multiplexer 104 combines the encoded video data from the video encoder 102 with the still image flag from the still image flag generator 703. A resultant composite signal is subjected to error concealment and frequency encoding processes of a recording encoder 105 for converting to a recording signal suitable for magnetic recording through a record head 110 onto a magnetic tape 106.

According the arrangement, a motion image of the video signal is recorded on a frame by frame basis while a still image of the same is recorded by repeating a desired frame. The discrimination of a still image from a motion image or vice versa can thus be made on the reproduction side by examining the still image flag. The repeating of any still image frame may be predetermined to a desired number of times as is possible for recording one frame only.

Figure 8:
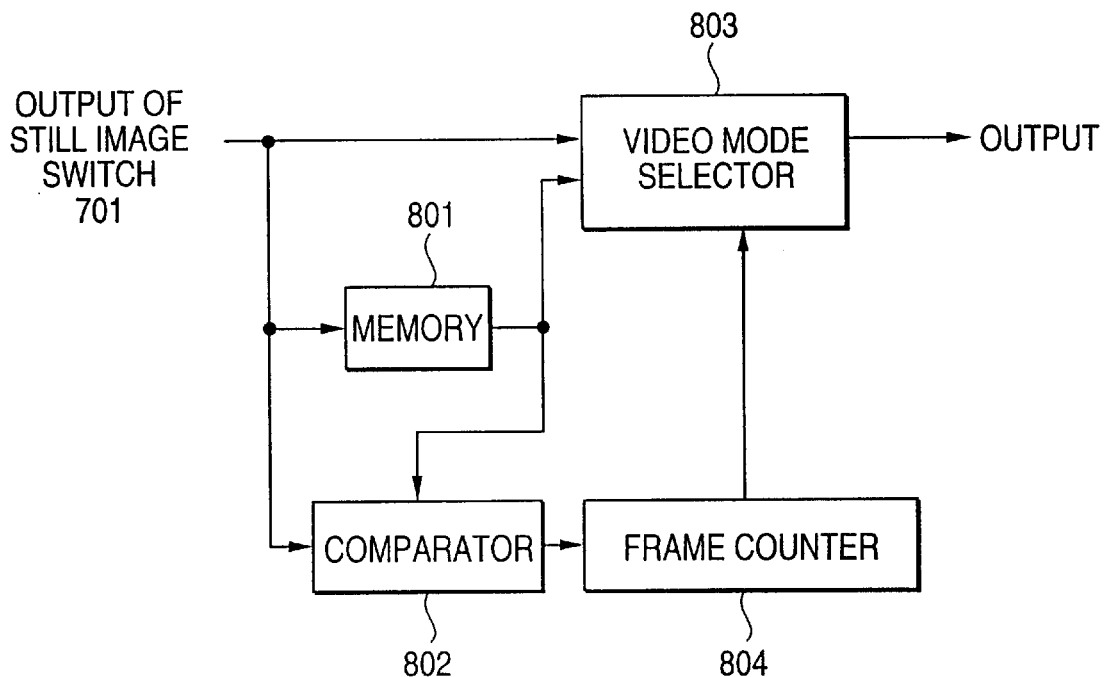
FIG. 8 is a block diagram of an exemplary arrangement of a still image flag generator according to the present invention.

FIG. 8 is a block diagram of an exemplary arrangement of the still image flag generator 703, in which an image mode signal from the still image button-switch 701 is temporarily stored in a memory 801. An image mode signal of the present frame newly delivered from the still image button-switch 701 is compared by a comparator 802 with the image mode signal of the preceding frame stored in the memory 801. If the two image mode signals are not identical to each other, a frame counter 804 is reset to 0. It is noted that the resetting is carried out after counting to 2 or more. As the frame counter 804 counts up frame by frame, its sends to an image mode selector 803 as a count the number of frames, generally (n)−1, after change of the image mode. If the count of the frame counter 804 is less than 2, the image mode selector 803 delivers from an output 805 a flag of the same image mode as of the previous frame. If the count is 2 or more, the image mode selector 803 delivers a flag of the image mode of the present frame.

More specifically, when three or more frames are not input in a sequence after change of the image mode, the image mode flag cannot be shifted. This means that at least three continuous frames are recorded in the still image mode.

According to the arrangement shown in FIG. 8, the still image flag prohibits any single frame from isolating between different still or motion image frames. If the recording is interrupted frame by frame in common VCRs, the error rate about the interruption will increase. In the still image recording mode, different still images are introduced before and after the interruption and error between frames will hardly be corrected. In this embodiment, the change of the image mode is properly controlled thus ensuring optimum recording and reproduction of still images.

Figure 9:
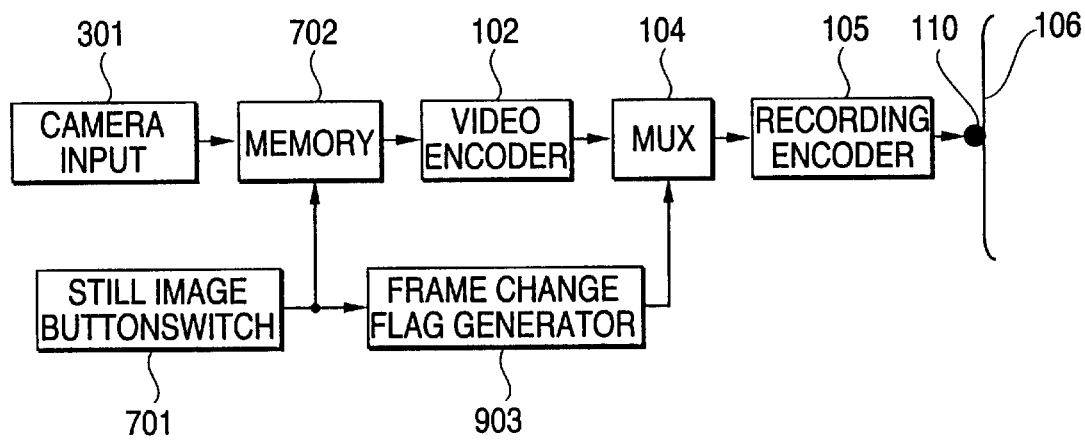
FIG. 9 is a block diagram showing a fifth embodiment of the video signal recording apparatus of the present invention.

FIG. 9 shows a fifth embodiment of the video signal recording apparatus according to the present invention. A digital video signal fed to a camera input 301 is temporarily stored in a memory 702. As a still image button-switch 701 is activated, a resultant frame change signal representing the change to a new still image frame is transmitted to the memory 702 and to a frame change flag generator 903. More specifically, when the still image button-switch 701 is pressed once, a frame of a desired still image is recorded and when pressed again, a frame of the succeeding still image is recorded.

The memory 702 in response to the frame change signal from the still image button-switch 701 (indicating the change of a still image between present and succeeding frames) delivers video data of the succeeding frame to video encoder 102. If the two frames are identical, video data of the present frame is repeatedly transferred from the memory 702 to the video encoder 102.

The video data is then compressed and encoded by the video encoder 102 to a recording signal which is fed to a multiplexer 104. The frame change flag generator 903 produces a frame change flag as "0" when the two consecutive frames are identical (having the same still image) and as "1" when they are not identical (carrying different still images). The frame change flag is also fed to the multiplexer 104.

The encoded video data from the video encoder 102 is multiplexed by the multiplexer 104 with the frame change flag from the frame change flag generator 903. A resultant composite signal is subjected to encoding of a recording encoder 105 for converting to a format signal suitable for magnetic recording by a record head 110 onto a magnetic tape 106.

Accordingly, the change of a still image from one frame to the other will successfully be detected by examining the frame change flag.

Figure 10:
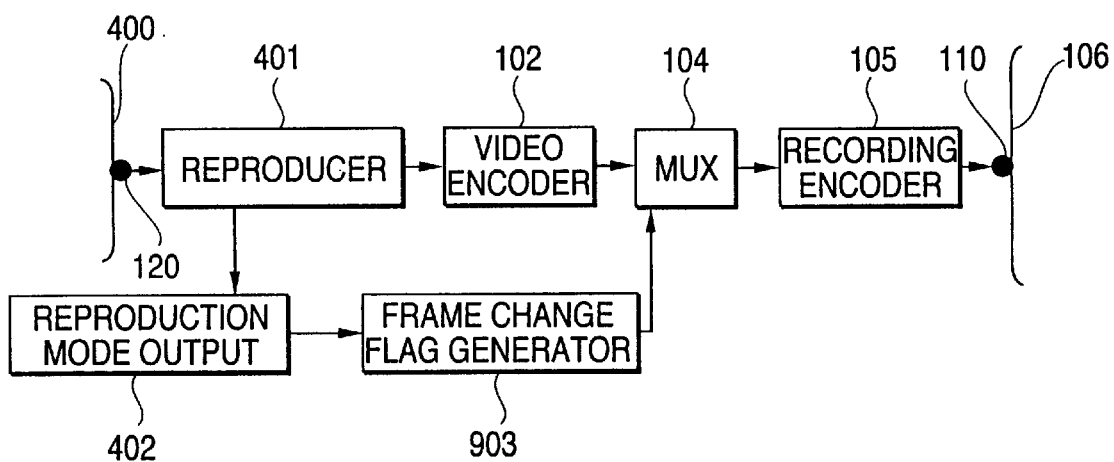
FIG. 10 is a block diagram showing a sixth embodiment of the video signal recording apparatus of the present invention.

FIG. 10 illustrates a sixth embodiment of the video signal recording apparatus according to the present invention, where a recorded video data is reproduced and then recorded again. In a reproducing unit, a video data is retrieved by a playback head 120 from a magnetic tape 400 and processed with a processor 401. Simultaneously, a reproducing mode signal indicating the reproduction of a slow-motion or still image is released from a reproduction mode output 402 which determines and produces the mode signal by examining the tape feed movement and the processing action of the processor 401. The change to a new frame in the slow-motion mode is also detected by the reproduction mode output 402.

The video data reconstructed in the reproducing unit is then fed to a video encoder 102 where it is compressed and encoded to a recording signal. The frame change signal from the reproduction mode output 402 is fed to a frame change flag generator 903. In common reproduction of a motion image data, the entire frames are different from each other. In the slow-motion or still image mode, a group of identical frames constitutes a part of a slow-motion image or a still image and thus, two consecutive frames are either identical or different. The frame change flag generator 903 produces a frame change flag as "0" when the two consecutive frames are identical and as "1" when they are not identical. The frame change flag is then fed to a multiplexer 104.

The encoded video data from the video encoder 102 is multiplexed by the multiplexer 104 with the frame change flag from the frame change flag generator 903. A resultant composite signal is subjected to encoding of a recording encoder 105 for converting to a format signal suitable for magnetic recording by a record head 110 onto a magnetic tape 106.

Accordingly, when the video data is a slow-motion or still image, a series of identical frames are recorded for a plurality of frame periods. This mode is detected by examining the frame change flag and the common motion image and the slow-motion or still image will clearly be discriminated from each other.

Figure 11:
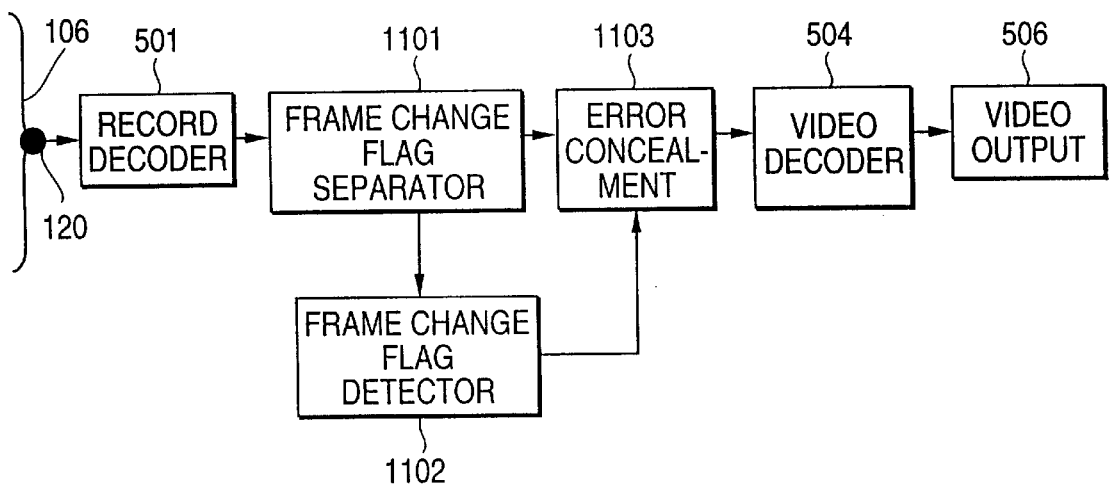
FIG. 11 is a block diagram showing a second embodiment of the video signal reproducing apparatus of the present invention.

FIG. 11 shows a second embodiment of the video signal reproducing apparatus according to the present invention and will be explained in respect to reproduction of the video data recorded with the recording apparatus of the present invention shown in FIG. 9 or 10. The video data retrieved by a playback head 120 from the magnetic tape 106 is decoded by a decoder 501 to its digital form. The decoded video data is then divided by a frame change flag separator 1101 into a video signal and a frame change flag. The video signal is transferred to an error concealment 1103 and the frame change flag is fed to a frame change flag detector 1102 where it is examined whether two, previous and present, frames are identical or not.

The error concealment 1103 replaces missing data in the reproduced video signal by interpolation. In common still image mode, the previous and present frames are identical having the same data and a dropout in the present frame is interpolated with corresponding data of the previous frame. If the two frames are different from each other, such interpolation is not applicable. In this case, the dropout may be replaced with a similar data of any adjacent frame.

When the previous and present frames are identical, the error concealment 1103 corrects a data dropout in the present frame by interpolation. If the present frame is not identical to the previous frame, the error concealment 1103 interpolates the dropout using not data from the previous frame but a corresponding data from any adjacent similar frame.

A resultant corrected data of the error concealment 1103 is then decoded by a video decoder 504 and delivered from a video output 506.

The error concealment is carried out by interpolation with data in an identical or similar frame according to the frame change flag. Hence, unwanted artifacts resulting from the error concealment will be minimized. For recording of a still image, a series of the identical frames are used and error correction between the frames of the still image will be feasible. It is understood that if error correction in one still image fails to execute between its identical frames, it will be implemented using similar data of the frames of another still image.

Although the error concealment is followed by the decoding of the video data in the embodiment of FIG. 11, it may be carried out after the decoding.

Figure 12:
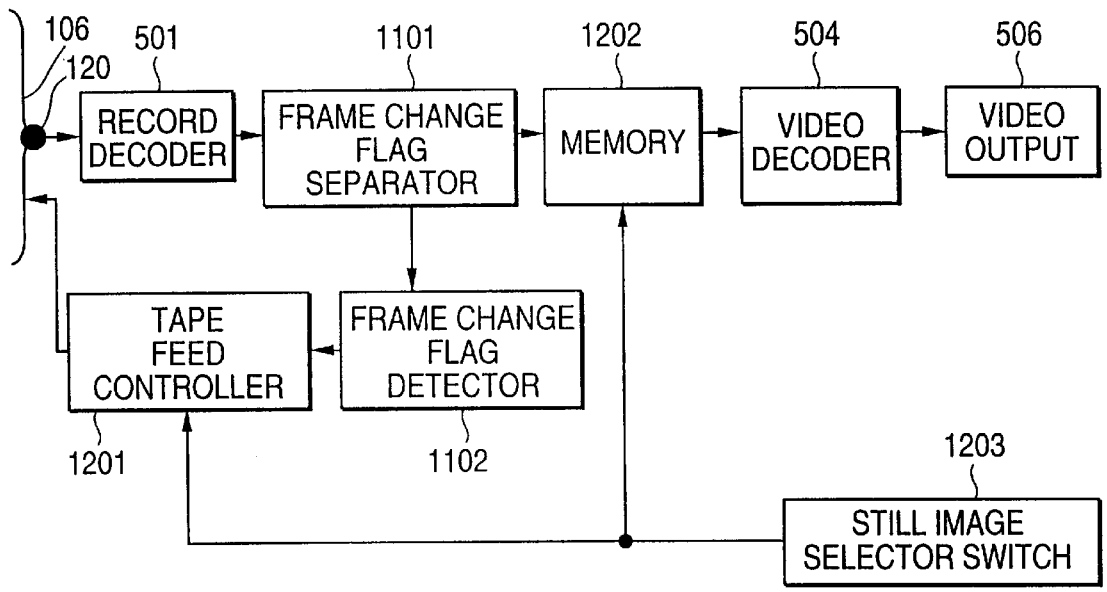
FIG. 12 is a block diagram showing a third embodiment of the video signal reproducing apparatus of the present invention.

FIG. 12 shows a third embodiment of the video signal reproducing apparatus according to the present invention, in which the video data recorded with the recording apparatus of the present invention shown in FIG. 9 or 10 is reproduced. The video data retrieved by a playback head 120 from the magnetic tape 106 is decoded by a decoder 501 to its digital form. The decoded video data is then divided by a frame change flag separator 1101 into a video signal and a frame change flag. While the video signal is transferred to a memory 1202, the frame change flag is fed to a frame change flag detector 1102 where it is examined whether two, previous and present, frames are identical or not.

A mode signal from a still image selector switch 1203 determined by an operator of the apparatus is indicative of either the present or succeeding still image being reproduced. When the present still image is requested, the frames of the present still image stored in the memory 1202 is continuously invoked and transferred to a video decoder 504. When the succeeding still image is wanted, the magnetic tape 106 is advanced to the address of a succeeding still image data by control with a tape feed controller 1201. The retrieval of the succeeding still image data is also determined by the frame change flag detector 1102. More specifically, the frame change flag detector 1102 can identify a location between two not-identical frames where the data of the succeeding still image starts. According to the mode signal of the still image selector switch 1203 and the resultant output of the frame change flag detector 1102, the tape feed controller 1201 determines the feeding of the magnetic tape.

The retrieved still image data is fed through the memory 1202 to the video decoder 504 where it is decoded on a frame by frame basis and transmitted to a video output 506.

According to the embodiment shown in FIG. 12, the frame by frame feeding of still images is feasible as well as of a motion image. The control of the feeding action is not limited to the embodiment and will be conducted by any applicable manner. It is also possible to locate the memory after the video decoder.

Figure 13:
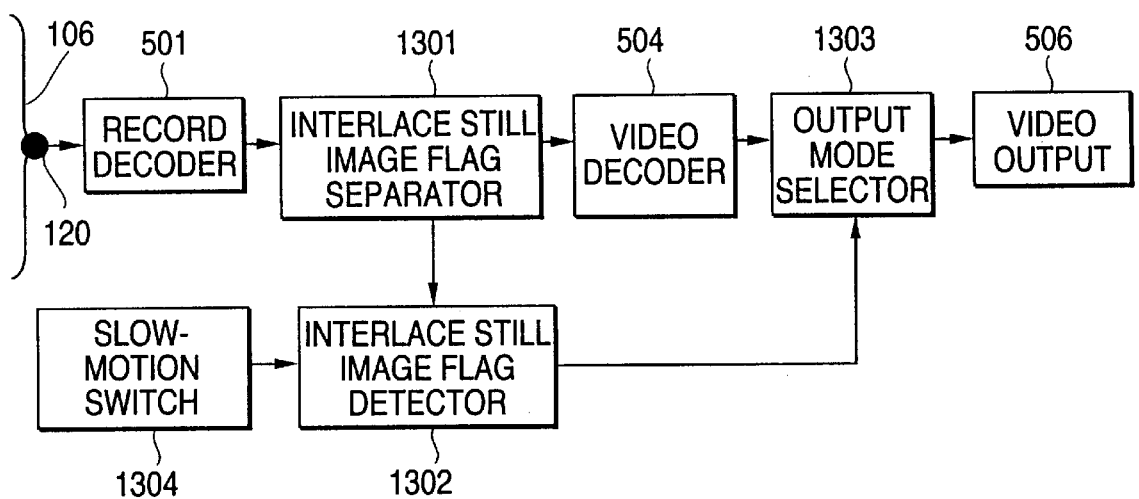
FIG. 13 is a block diagram showing a fourth embodiment of the video signal reproducing apparatus of the present invention.

FIG. 13 illustrates a fourth embodiment of the video signal reproducing apparatus according to the present invention. It is a good idea as shown in FIG. 1b that a plurality of different flags are added to the video data. The reproducing apparatus of this embodiment is intended to reproduce a recorded signal multiplexed with both the interlace flag and the still image flag. The signal retrieved by a playback head 120 from a magnetic tape 106 is decoded by a record decoder 501 to a digital data. The digital data is then divided by an interlace flag/still image flag separator 1301 into the interlaced flag, the still image flag, and the video data. The video data is decoded on a field by field basis with a video decoder 504 and transferred to an output mode selector 1303.

The interlace and still image flags are fed to an interlace flag/still image flag detector 1302 where they are used to examine whether or not the video data is interlaced and carries a still image. Simultaneously, a slow-motion switch 1304 delivers a corresponding signal of common motion, slow-motion, or still image mode as determined by an operator of the apparatus.

If it is judged by the output mode selector 1303 that the video data is an interlaced still image and the signal from the switch 1304 indicates the slow-motion or still image mode, the video data is interlaced and transmitted to the video output 506. If it is judged by the output mode selector 1303 that the video data is a non-interlaced or motion image and the signal from the switch 1304 indicates the slow-motion or still image mode, the video data is not interlaced but transmitted directly to the video output 506. The output mode selector 1303 is identical in the construction to that shown in FIG. 6 where the selector 602 is adapted responsive to an output of the interlace flag/still image flag detector 1302.

According to the arrangement shown in FIG. 13, the frame of a still image (of an interlaced video signal) can automatically be reproduced in the slow-motion or still image mode thus providing a higher resolution.

It is understood that the video data encoding, multiplexing, recording data encoding, recorded data decoding, and video data decoding in the embodiments can be implemented by any appropriate manners. The present invention is applicable to not only the magnetic tape recording but also magnetic disk recording, optical disk recording, optomagnetic recording, and other medium recording, and to data transfer through various means including cables. The present invention is not limited to the foregoing embodiments and a combination of some of the embodiments and other arrangements will be possible. A part or section of any embodiment may be implemented by either a hardware or a software.

Any of the described apparatuses may be reduced in cost by selecting between the presence and absence of an interlace flag or a non-interlace flag. Similarly, the still image flag and/or the frame change flag may be prepared to have only constant values. It is also possible that the reproducing apparatus is adapted to perform a reproduction regardless of any flags.

As set forth above, the recording apparatus and the reproducing apparatus according to the present invention are obviously feasible using simple arrangements and highly suitable for practical use.

What is claimed is:

1. A video signal processing method for processing an input video signal which is composed of video data of continuously occurring frames, said method comprising the steps of:

encoding a frame of video signal to obtain a frame of coded video data and repeating the frame of coded video data for n frame periods (n being an integer larger than two) to obtain n consecutive identical frames of coded video data;

assigning a first value to a frame change flag for the first frame of the n consecutive identical frames of coded video data; and assigning a second value which is different from said first value to a frame change flag for each of the remaining frames of the n consecutive identical frames of coded video data.

2. A video signal processing method for reproducing video data from a recording medium, and then transmitting or recording the reproduced video data, said method comprising the steps of:

reproducing a same frame of video data repeatedly for n consecutive frame periods (n being an integer larger than two) to obtain n consecutive identical frames of video data;

assigning a first value to a frame change flag for the first frame of the n consecutive identical frames of coded video data; and assigning a second value which is different from said first value to a frame change flag for each of the remaining frames of the n consecutive identical frames of coded video data.

3. A video signal processing apparatus for processing an input video signal which is composed of video data of continuously occurring frames, said apparatus comprising:

encoding means for encoding a frame of video signal to obtain a frame of coded video data and repeating the frame of coded video data for n frame periods (n being an integer larger than two) to obtain n consecutive identical frames of coded video data;

flag assigning means for assigning a first value to a frame change flag for the first frame of the n consecutive identical frames of coded video data, and a second value which is different from said first value to a frame change flag for each of the remaining frames of the n consecutive identical frames of coded video data;

multiplexing means for multiplexing the frame change flag with a corresponding frame of coded video data to obtain a multiplexed video data; and means for transmitting or recording the multiplexed video data.

4. A video signal processing apparatus for reproducing video data from a recording medium, and then transmitting or recording the reproduced video data, said apparatus comprising:

reproducing means for reproducing a same frame of video data repeatedly for n consecutive frame periods (n being an integer larger than two) to obtain n consecutive identical frames of video data;

flag assigning means for assigning a first value to a frame change flag for the first frame of the n consecutive identical frames of coded video data, and a second value which is different from said first value to a frame change flag for each of the remaining frames of the n consecutive identical frames of coded video data;

multiplexing means for multiplexing the frame change flag with a corresponding frame of coded video data to obtain a multiplexed video data; and means for transmitting or recording the multiplexed video data.

5. A video signal processing apparatus for processing reproduced frames of video data, each frame of said reproduced frames being accompanied with a frame change flag which has a first value indicating that the frame is different from a previous reproduced frame and a second value indicating that the frame is identical with the previous reproduced frame, said apparatus comprising:

flag detecting means for detecting the frame change flag of a current reproduced frame of video data and for examining whether the detected frame change flag has the first value or the second value; and error concealment means for error concealing the video data of the current reproduced frame by using video data of the previous reproduced frame when the detected frame change flag has the second value or by using video data of the current reproduced frame when the detected frame change flag has the first value.

6. A video signal processing apparatus for processing reproduced frames of video data, each frame of said reproduced frames being accompanied with a frame change flag which has a first value indicating that the frame is different from a previous reproduced frame and a second value indicating that the frame is identical with the previous reproduced frame, said apparatus comprising:

flag detecting means for detecting the frame change flag of a current reproduced frame of video data and for examining whether the detected frame change flag has the first value or the second value;

still image selection means for selecting a still image; and frame output means for outputting the current reproduced frame or outputting the current reproduced frame of video data for n frame periods (n being an integer larger than two) to obtain n consecutive identical current reproduced frames of video data when a still image is requested by the still image selection means, and for outputting a reproduced frame which is the same as or subsequent to a reproduced frame which is subsequent to the current reproduced frame and accompanied by the frame change flag having the first value when another still image is requested by the still image selection means.

* * * * *